United States Patent
Subbiah

(10) Patent No.: US 7,249,183 B1
(45) Date of Patent: Jul. 24, 2007

(54) METHOD TO ENABLE CONTINUOUS MOBILITY ACROSS WIRED AND WIRELESS NETWORK INTERFACES

(75) Inventor: Barani Subbiah, Sunnyvale, CA (US)

(73) Assignee: 3Com Corporation, Marlborough, MA (US)

( * ) Notice: Subject to any disclaimer, the term of this patent is extended or adjusted under 35 U.S.C. 154(b) by 759 days.

(21) Appl. No.: 10/163,139

(22) Filed: Jun. 4, 2002

(51) Int. Cl.
  *G06F 13/00* (2006.01)
(52) U.S. Cl. .................................................... 709/227
(58) Field of Classification Search ................ 370/216, 370/217, 218; 709/227; 714/2, 3, 4, 43
See application file for complete search history.

(56) References Cited

U.S. PATENT DOCUMENTS

| | | | |
|---|---|---|---|
| 6,392,990 B1 * | 5/2002 | Tosey et al. ................ | 370/218 |
| 2003/0221034 A1 * | 11/2003 | Cheng ........................ | 710/301 |

OTHER PUBLICATIONS

IEEE Computer Society, "IEEE Trial-Use Recommended Practice for Multi-Vendor Access Point Interoperability via an Inter-Access Point Protocol Across Distribution Systems Supporting IEEE 802.11™ Operation," IEEE Standards, Jul. 14, 2003, The Institute of Electrical and Electronics Engineers, Inc., New York, NY.
Perkins, C., ed. "IP Mobility Support for IPv4," RFC3344.txt Memo, Aug. 2002, The Internet Society.

* cited by examiner

*Primary Examiner*—Robert B. Harrell

(57) ABSTRACT

A method for switching between an individual computer's network interface technologies without interrupting any pending data transmissions on the existing network connection. The method include detecting when an existing network connection is no longer connected and if there are any available network connections on different network interface technologies. In addition, the method determines the address of the new connection and reassociates all existing data flow with the new network connection. Data is then routed to the new network connection whether it is on the same subnet or a different subnet.

16 Claims, 6 Drawing Sheets

METHOD TO ENABLE CONTINUOUS MOBILITY ACROSS WIRED AND WIRELESS NETWORK INTERFACES

BACKGROUND OF THE INVENTION

1. The Field of the Invention

This invention relates generally to the field of computer networking. In particular, embodiments of the present invention relate to systems and methods for maintaining a network connection while a computer moves between network interface connection points.

2. The Relevant Technology

Computer and data communications networks continue to proliferate due to declining costs, increasing performance of computer and networking equipment, and increasing demand for communication bandwidth. Communications networks—including wide are networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network. Historically, a majority of installed networks utilize a wire-based communications medium. That is, the interconnections between computers and peripherals are accomplished with elaborate wire and cable-based connection systems. Depending on the size and type of network involved, the cost, installation, maintenance and upgrading of such networks is quite complex and requires sophisticated skills. Moreover, even the physical space needed for today's wire-based network systems can be prohibitive.

One solution to some of the drawbacks of wire-based connections is the use of short range wireless communication schemes to interconnect computers and computer peripherals within a network. The use of wireless communications provides a number of advantages, including the elimination of complex, expensive, and inconvenient wire and cable-based connections. A number of wireless communications standards have been developed for such applications; two popular examples are known as IEEE 802.11 and "Bluetooth." Both standards use low power radio frequencies to allow communication between various devices such as mobile phones, laptop and desktop computers, printers, modems, PDAs, and the like.

Bluetooth technology was originally envisioned for the purpose of replacing cabling and other hard-wired connection schemes used to connect auxiliary devices to a desktop or laptop computer. However, in addition to providing those types of capabilities, Bluetooth has further evolved into a method of sending both data and voice signals between a wide range of devices. For example, a Bluetooth-enabled PDA could be configured to automatically connect to a Bluetooth-enabled communications link to an established network within a building, therefore gaining wireless access to computing resources such as printers, Internet portals, etc.

Similarly, 802.11 transceivers provide the ability to create a wireless connection between a computer-device and other 802.11 enabled devices, such as a wireless hub connected to an existing local area network. In this environment, an 802.11 equipped device can exist as a node on a local area network, yet does not require a physical connection to the network. Like Bluetooth, aside from the advantages relating to the elimination of wires and cabling, this wireless attachment scheme allows a user—especially a user of a mobile computing device—to maintain a network connection even while physically moving, for example between offices.

Thus, such wireless schemes provide the ability to connect any one of a number of computing devices to a standard wire-based LAN that would normally require some form of wired connection, such as an Ethernet network interface card (NIC) and cable. Consequently, as this wireless technology becomes more prevalent, it has become increasingly important to seamlessly integrate wireless communication devices with traditional wired-based networks. However, there have been a number of problems in integrating wireless networking within existing wire-based networks.

One problem relates to difficulties associated with switching a computer's configuration between a wire-based, and a wireless-based network. As is well known, computers generally need to be reconfigured when connection to a new peripheral device, such as a network access device. In addition, the computing device often needs to undergo a "reboot" process to complete a reconfiguration to allow it to detect new connections or a major change in the system hardware. Also, when a user wishes to switch network interfaces between different network technologies, it is usually necessary to execute a separate software application that is compatible with the new network environment, and then reconnect with the new network interface device. For example, if a computer is directly connected to the Internet over an wire-based Ethernet connection and then the user wishes to reconnect over a dial up connection, the user must physically disconnect the old connection and then launch an application that allows for a dial up connection, and possibly reconfigure the computing device (including a possible re-boot) so as to permit communication via the dial up connection). Obviously, such steps are time consuming and require a certain level of knowledge and expertise on the user's part. The need for this sort of configuration process has become increasingly common with the continued proliferation of portable computing devices such as laptops, PDAs, cell phones, and the like. As a user moves from one network environment to another, there is often the need to "reconfigure" the computing device to function within the new environment.

Therefore, there is a need for an ability to allow a computing device to seamlessly switch between network technologies. For example, it would be an advancement in the art to provide a portable computing device with the ability to seamlessly and transparently interface between a wire-based network connection (such as Ethernet via an Ethernet NIC connector) and a wireless connection (such as Ethernet via an 802.11 wireless connection). Preferably, such a solution would be capable of automatically reconfiguring the necessary profiles such that the user and the high level applications of the system do not need to be aware of the network interface switch.

BRIEF SUMMARY OF EMBODIMENTS OF THE INVENTION

These and other problems in the prior art are addressed by embodiments of the present invention, which relates to systems and methods that allow for the automatic switching between different network interface technologies to a network, while maintaining the network connection. For example, in one embodiment, the methodology enables a laptop computer (or any other computing device) to switch from a hard-wired Ethernet connection (i.e., via a NIC) to a wireless Ethernet connection (i.e., via a wireless 802.11 connection) in the same or different subnets of a local area network. Moreover, the computer maintains an operative connection with the network during the switch between the wired and the wireless interface change, and does so in a manner that is transparent to the computer user.

In one exemplary embodiment, the present invention is implemented with computer executable instructions in the form of a mobility software package that executes on a programmable computing device, such as a laptop computer, handheld computer (e.g., a PDA), and the like. Preferably, the software package provides an interface between the upper level applications executing on the computing device, and the network interface device that allows the computer to interface with the corresponding network medium. Moreover, the application is implemented in a manner such that neither the computing device or the upper level applications need to be reconfigured when the mobility software application switches between network interface technologies. Preferably, the switch occurs in a seamless and transparent manner, so that the upper level applications and the user are oblivious to the switch to the new communications interface. Further, at no time is communication with the network lost. For example, if Microsoft® Explorer is downloading a particular file and the transfer is being made via a wired Ethernet LAN network interface card, the mobility software application could switch the network interface to an 802.11 card wirelessly connected to the same Ethernet LAN without interrupting the file transfer. In some embodiments, aspects of the invention may be implemented via executable software that executes on other parts of the local area network, such as a network bridge, gateway, server, switches and the like to provide mobility within a LAN.

In presently preferred embodiments, the mobility software application is configured so as to enable a computing device, such as a laptop/notebook computer, to switch between different network interface technologies that are connected to the same LAN subnet, or that are connected to different subnets of the network. For example, if the different network interface technologies are connected to the same subnet, the computer can keep the same IP address and associate the new MAC address of the new network interface device with that IP address. While this re-association can be accomplished in different ways, in one preferred embodiment the computer sends out an address resolution protocol (ARP) message requesting all devices within the subnet to now associate the new MAC address with the IP address. Alternatively, the host computer communicates directly with one or more of the switches within the subnet for the same purpose.

In another scenario, the computer can include multiple network interface devices that are capable of being connected to different subnets of a network. For example, a user may disconnect a hard-wire network connection (such as an Ethernet NIC) from one subnet, and then physically relocate the computer to an area of a second subnet having a wireless access point, thereby requiring access via a second interface device, such as an 802.11 interface. Methods of the present invention allow the computer to reconnect at the second subnet in a seamless and transparent manner. In a preferred embodiment, the host computer first obtains a new IP address corresponding to the second subnet. The host computer communicates the new IP address to the server device within the first subnet and a "tunneling" mechanism is established, whereby data that is addressed to the IP/MAC address of the first network interface device is routed to the new IP address corresponding to the MAC address of the second network interface device (i.e., the 802.11 interface) of the second subnet. In this way, any data communicated to the computer in the first subnet is automatically routed to the host connection in the second subnet. Moreover, this routing occurs in a transparent and seamless fashion; there is no need for the user to re-configure the host computer for operation on the second subnet.

The foregoing, together with other features and advantages of the present invention, will become more apparent when referred to the following specification, claims and accompanying drawings.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to systems and methods that enable a computing device, such as a portable computer, to maintain a continuous and uninterrupted network connection while switching between network interface device technologies. Allowing a computer to seamlessly switch between network interfaces provides a user with greater mobility, especially with the increasing prevalence of wireless communication technologies. Moreover, preferred embodiments provide the function in a manner so that switching occurs transparently, and a user is not burdened with the need for reconfiguring or otherwise altering the computing device. Also, for purposes of illustration and convenience, embodiments of the present invention are described in the context of certain wireless and hard-wired network interfaces. However, it will be appreciated that the teachings of the present invention are applicable to other network environments and network interface technologies as well.

Figure 1:
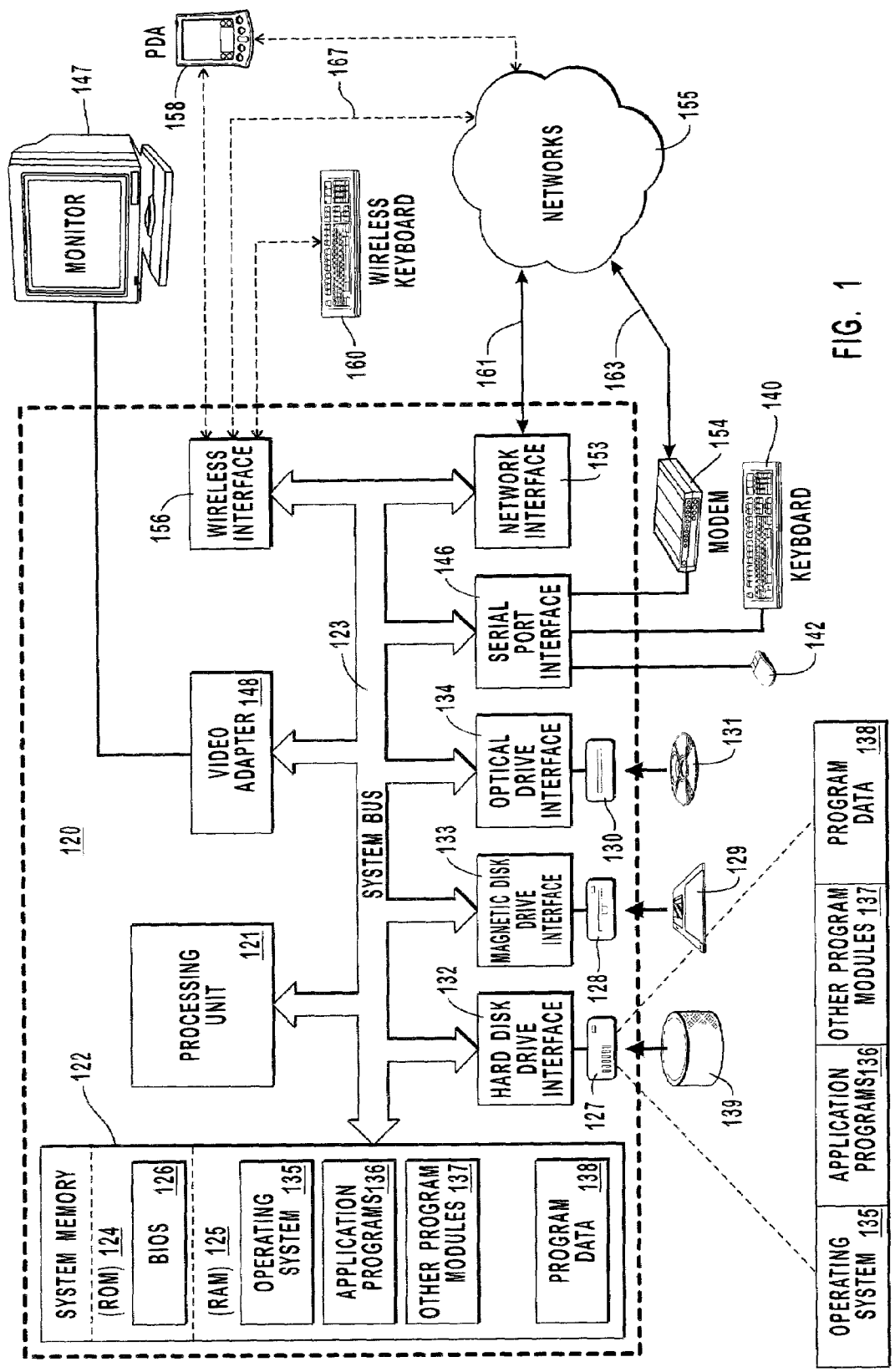
FIG. 1 illustrates an example processing system that provides a suitable operating environment for embodiments of the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a local area network (LAN) 161, and a wide area network (WAN) 163. Each of the logical connections 167, 161, 163 represent a different way for the computer 120 to connect to the network 155. Moreover, actual connection to the corresponding network is facilitated by a network interface device operatively connected to the computer. For example, the wireless network 167 may utilize radio frequencies, microwaves, infrared light, etc. to transmit signals via the wireless interface 156 to the network 155. Connection to the LAN 161 is accomplished via a hard-wired network interface device, such as that represented at network interface 153. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of further example, the wireless interface 156 could be implemented as a short range radio transceiver that preferably utilizes low power radio frequencies to transmit information over relatively short distances. For example, the wireless interface could be implemented as a Bluetooth or an 802.11 radio tranceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented in accordance with the 802.11 wireless standard. As such, the 802.11 transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the 802.11 module itself (e.g., 156 in FIG. 1).

Figure 2:
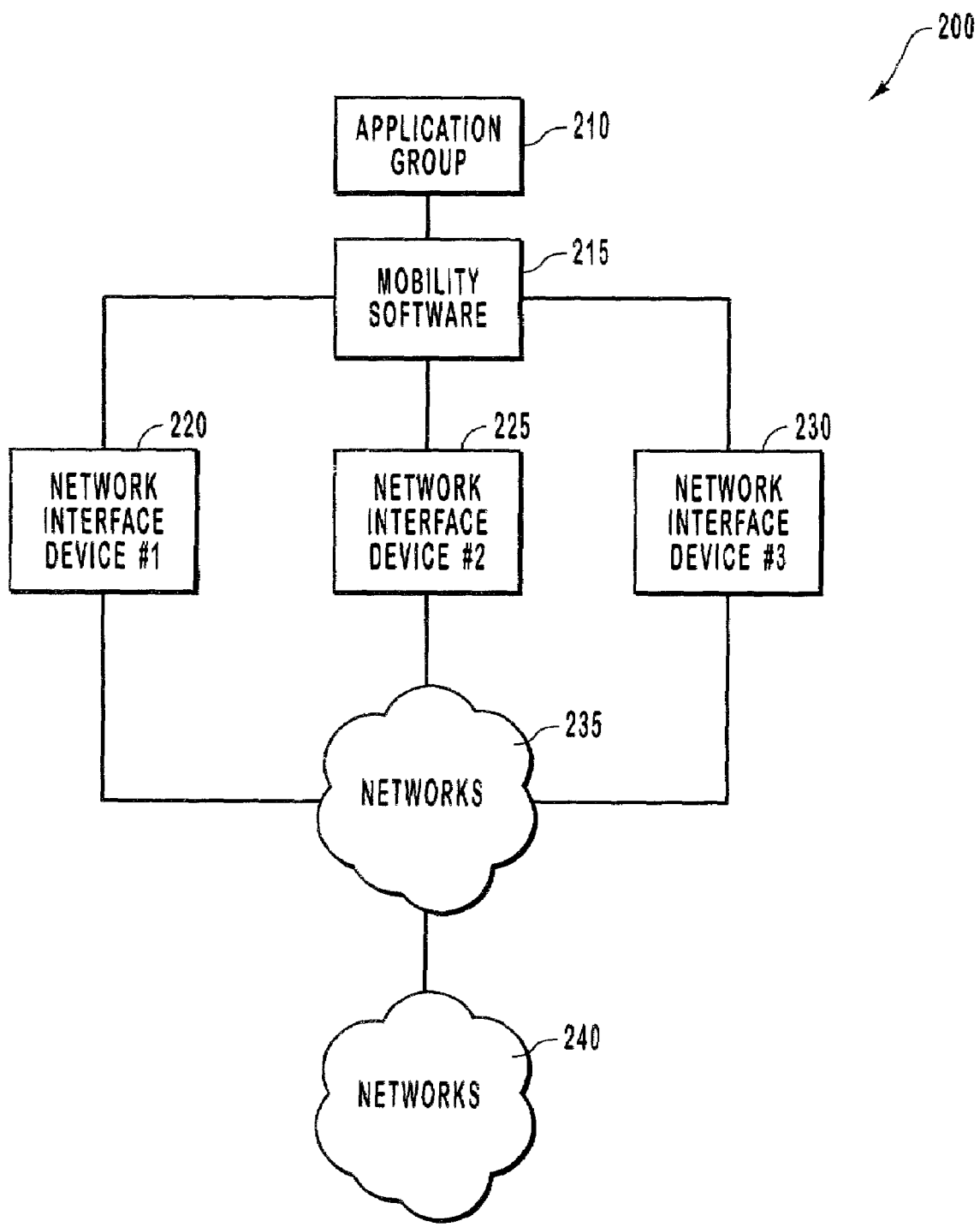
FIG. 2 illustrates a simplified function block diagram of an environment for one presently preferred embodiment that enables a network connected computer to maintain a continuous connection while changing network interface devices.

Reference is next made to FIG. 2, which illustrates a simplified functional block diagram, designated generally at 200, of one exemplary environment of the present invention. In preferred embodiments, the methodology of the present invention is implemented via computer executable program instructions configured as mobility software application. In general, the application enables a computer, such as that designated in FIG. 1, to maintain a continuous and uninterrupted network connection while changing network interface devices (such as those designated at 156 and 153 in FIG. 1. In the illustrated example, the overall environment 200 is comprised of multiple sub-elements which are vertically positioned to indicate a sequence of communications. The application group 210 represents the upper level applications that interact directly with the user and are executing on the computing device. The mobility software 215 represents one embodiment of a software application implemented in accordance with the teachings of the present invention and that enables the switching between network interface devices in a manner that does not interrupt an existing network connection. By way of example, FIG. 2 denotes three network interface devices at 220, 225, and 230, each of which represent a hardware device that is capable of interfacing a host computer with a corresponding network, denoted at 235. Common network interface devices include Modems, Ethernet, and Token Ring network interface cards (NICs), 802.11 wireless modules, Bluetooth wireless modules, and the like. In this particular example, the network 235 is connected to another wide area network (WAN), such as the Internet 240. Also, while the figure indicates that the network 235 is a single LAn, it could be comprised of multiple subnets and various topological configurations.

As is further shown in FIG. 2, in a preferred embodiment the mobility software application 215 is logically positioned below the application group 210 in a host computer (such as that described in connection with FIG. 1), and is implemented in a manner so as to be capable of performing all switching functions without requiring any reconfiguration of the application group 210. For example, if an application from the application group 210 was communicating over network interface device #1 220, the mobility software would have the capability to switch the connection over to network interface device #2 225 without the application knowing a switch was made, or otherwise disrupting the network connection. Therefore, it is not necessary to update any portion of the application group 210 to install or operate the illustrated embodiment of the mobility software application.

Figure 3:
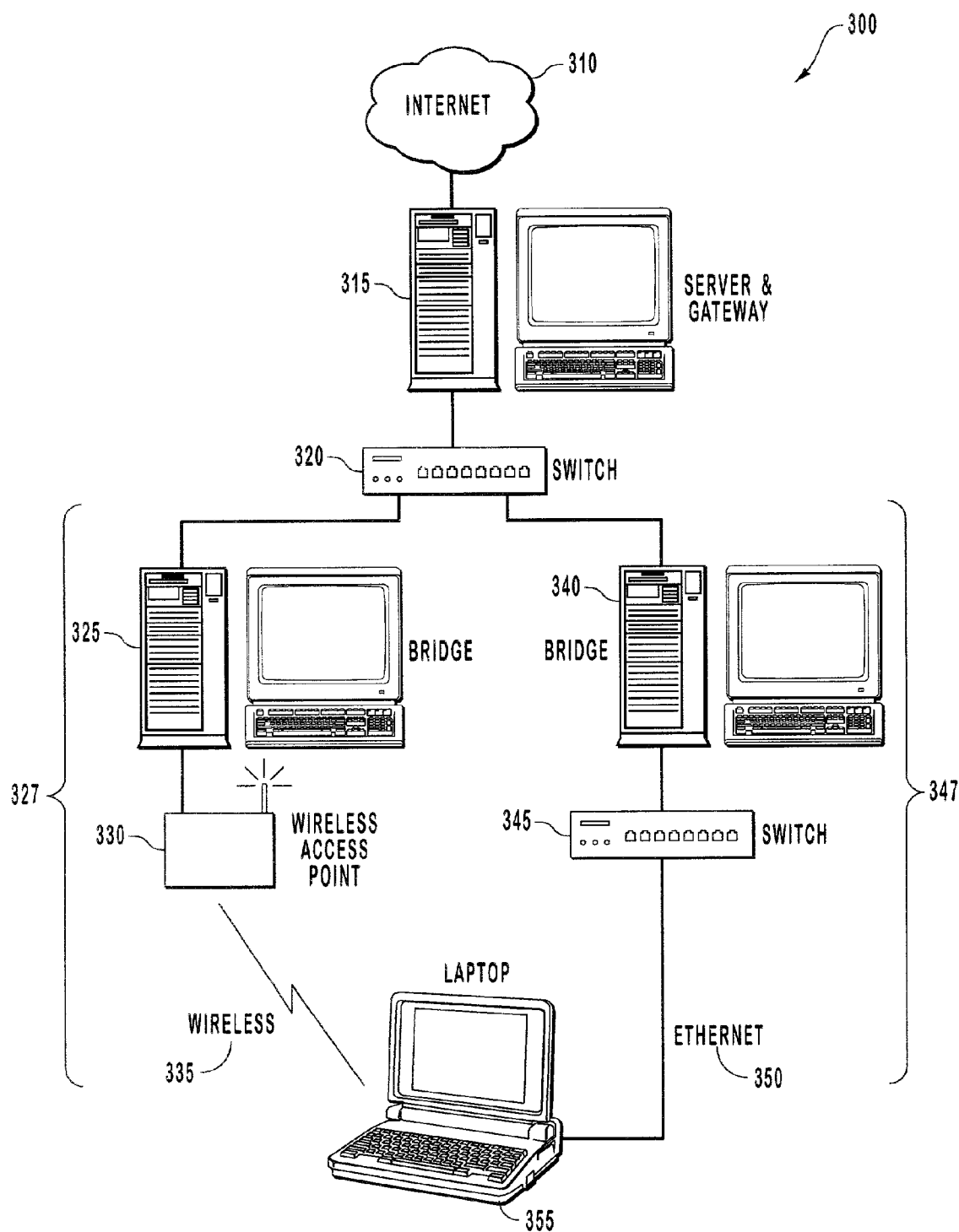
FIG. 3 illustrates an exemplary computer network environment in which a portable computer device equipped with one software implemented embodiment of the invention has the ability to change network interface technologies that are located within the same subnet.

Reference is next made to FIG. 3, which illustrates an example of a computer network environment, designated generally at 300. The network 300 includes a portable computer device 355 that is equipped with one embodiment of the mobility software application (215 in FIG. 2) that allows the computer 355 to utilize and switch between multiple network interface devices that are each connected to the same subnet of network 300. In this particular example, the computer network 300 is said to contain only one subnet because both wireless 335 and Ethernet 350 network access segments, denoted at 327 and 347, are each managed and controlled by one server 315. Here, the server 315 also acts as a gateway to the Internet 310. In this general example, access to the network 300 is provided to the computer 355 via a wireless access point 330, such as an 802.11 wireless access station, and a wired access point via switch 345. Of course, any one of a different alternate configurations and access schemes could be used. The example further includes bridges 325 and 340; again, any one of a number of different network devices could be included within the network 300.

In a wireless network segment, denoted at 327, network data packets can be forwarded to the wireless access point 330, which converts the electrical data packets into wireless transmissions. The wireless transmissions are then received and decoded by a wireless network interface device (note shown) that is functionally attached to the computer 355. In the wired, Ethernet network segment, denoted at 347, network data packets can be forwarded to a switch 345, which then forwards them on to an Ethernet network interface card (not shown) also operably connected to the computer 355. Network data packets can also originate at the computer 355 and provided to the network 300 via the wireless 335 or the wired 350 connection.

For purposes of illustration, it will be assumed that the computer 355 utilizes the same IP address for each of its network interface devices (e.g. 802.11 wireless card and Ethernet NIC) because they are each connected within the same subnet. Of course, the network interface devices will each have unique MAC addresses in a manner that is well known in the art. Thus, if the computer 355 establishes a connection over the Ethernet segment 347 of the computer network 300, the unique MAC address of the Ethernet network interface device (via 350) will be associated with the connection. All packets addressed to the IP address of the computer 355 will be forwarded and received via that MAC address.

In the event that the computer 355 switches from the hard-wired Ethernet connection 350 to a wireless connection 335, the mobility application handles the switch in a manner that does not the connection to the network 300 and thus does not disrupt the transmission of any data packets to or from the network 300. In a preferred embodiment, this is accomplished by "re-associating" the MAC address of the wireless network interface device at the 335 link with the IP address of the computer 355 in place of the Ethernet network interface device at 350. This re-association function could be provided in numerous ways while still keeping within the spirit of the invention. In a preferred embodiment, the computer 355 sends out an address resolution protocol (ARP) message to the other devices within the computer network environment 300. An ARP will tell the other devices to associate the new MAC address (of the wireless interface device at 335) with the IP address of the computer thereby causing other devices to update their respective lookup tables. With this particular approach, the mobility software application need only be installed on the computer 355.

Alternatively, the computer 355 could communicate directly with the switch 320 (or similar network device) so as to cause it to reroute all data packets addressed to the IP address of computer 355 to the new MAC address of the wireless network interface device. This embodiment would require that the switch 320 (or similar device) be equipped with a component of the mobility software functionality, in addition to the computer 355. Preferably, the mobility software application automatically re-associates the new network interface device when it is detected that the old network interface device is no longer connected to the network. For example, if the user disconnects the Ethernet connection 350 and moves the computer 355 to another room, the mobility software application would function so as to automatically route packets to the new MAC address of the wireless network interface device.

Figure 4:
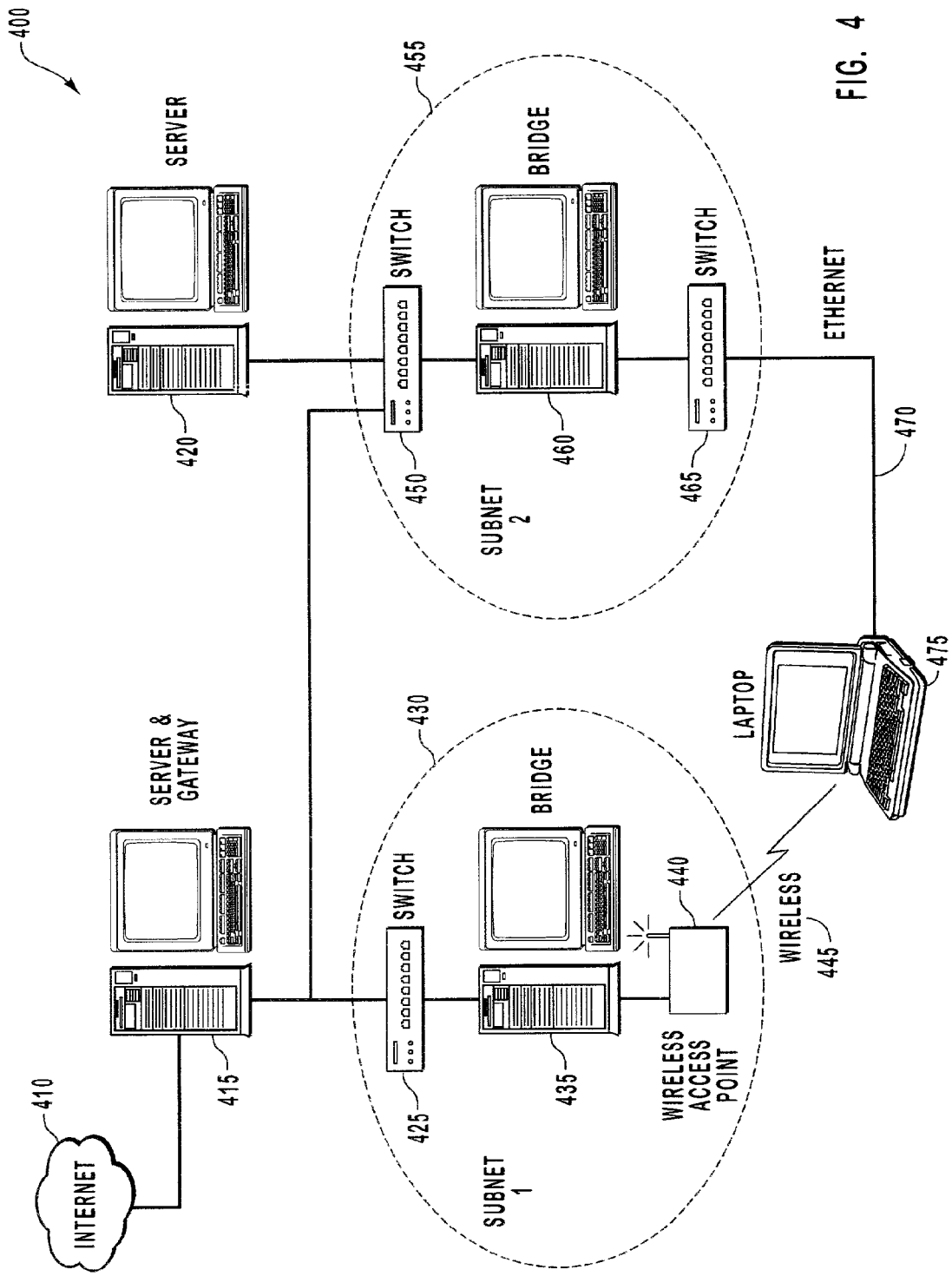
FIG. 4 illustrates an exemplary computer network environment in which a portable computer device equipped with one software implemented embodiment of the invention has the ability to transparently switch between network interface technologies that are connected to different subnets of a network.

Reference is next made to FIG. 4, which illustrates yet another exemplary computer network environment, designated generally at 400. Included in the network is a portable computer device 475 that is equipped with one embodiment of mobility software so as to provide the ability to switch between network interface devices and access the network 400 at different subnets, designated at 430 and 455. In this particular example, the computer network environment 400 is said to contain two subnets in the sense that each subnet 430 and 455 is controlled by an independent server, shown at 415 and 420 respectively. More specifically, in this example subnet 1, designated at 430, is controlled by server and gateway 415, and subnet 2, designated at 455, is controlled by server 420.

Each of the devices within each subnet are assigned different IP addresses in addition to unique MAC addresses. Thus, if the laptop computer 475 is connected to subnet 2 455 via an Ethernet NIC to 470, it will communicate within the network 400 via the unique MAC address of the Ethernet network interface device and the IP address assigned to the computer 475 within that subnet 455. In that connection state, packets will be forwarded to the computer 475 via that subnet IP address, and its associated MAC address.

However, in the situation where the computer 475 is disconnected from the hard-wired connection at 470, and moved to a location corresponding to the subnet 430, the mobility software of the present invention maintains the connection to network 400 in a seamless and transparent manner. For example, the portable computer 475 could switch from the hard-wired Ethernet connection 470 to a wireless connection 445 without interrupting the transmission/receipt of any data packets. In a presently preferred embodiment, this is accomplished by associating the MAC address of the wireless network interface device and the IP address of the computer 475 on subnet 1 430, with the IP address and MAC address associated with the computer 475 (and Ethernet network interface device) on subnet 2 455. While this re-association could be accomplished in a number of ways, in one preferred embodiment it is accomplished by setting up a tunneling mechanism in which data packets originally sent to the old IP and MAC address are tunneled, or mapped, to the new IP and MAC address associated with computer 475 on subnet 1 430.

This tunneling or mapping operation may be provided within the switches 425, 450 located within each subnet, or can be provided by the servers overseeing the respective subnets, shown at 415 and 420 in FIG. 4. Preferably, components of the mobility software will automatically detect that a connection has been established with the new network interface device is located on a different subnet and proceed to implement the proper re-association procedure corresponding to this configuration. This process can be automatically reversed if the user reconnects to the original network interface device.

Figure 5:
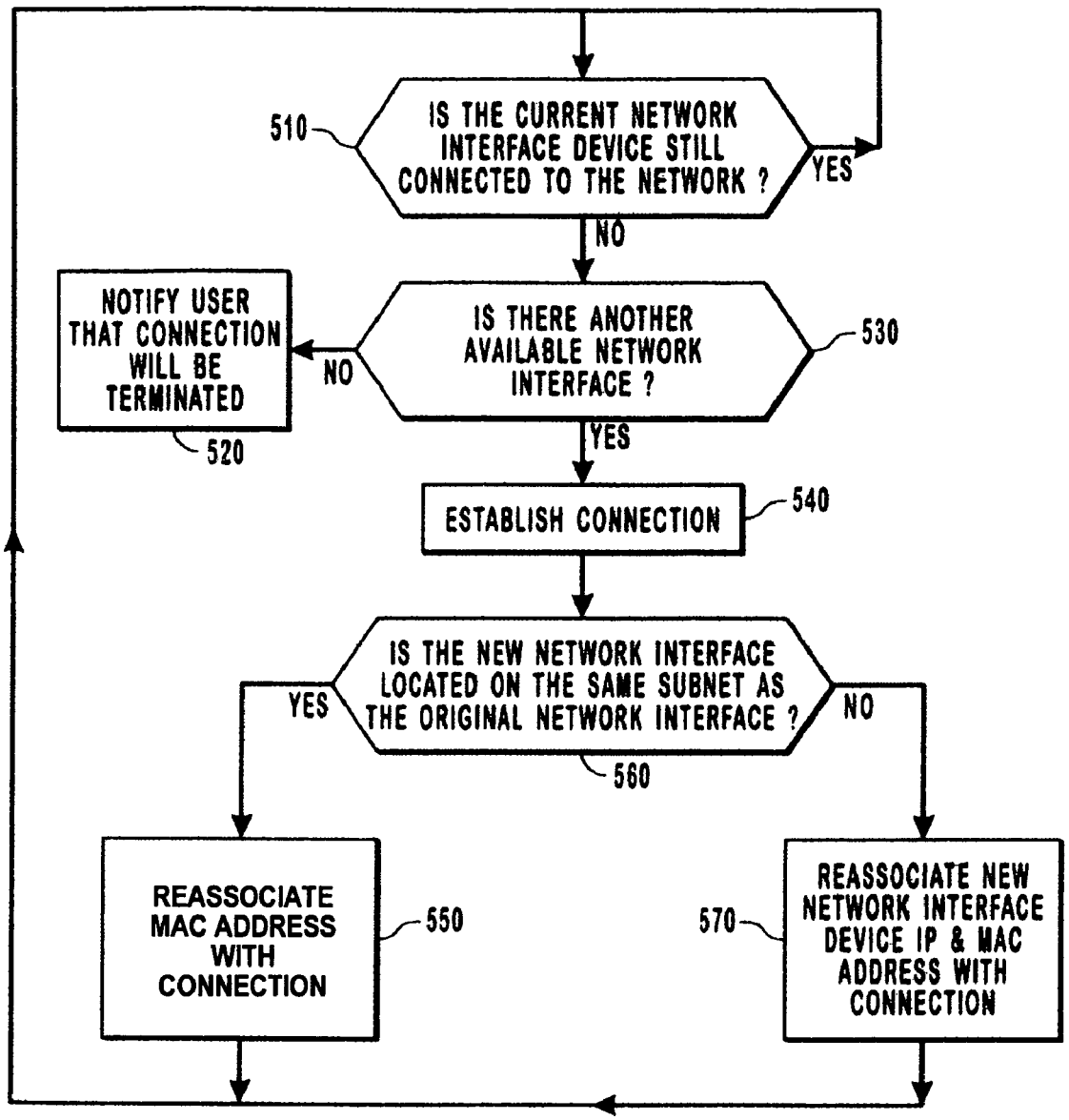
FIG. 5 illustrates a flow chart of one presently preferred embodiment of a method that enables a computer to maintain a continuous connection to a network while switching between network interface devices.

Reference is next made to FIG. 5, which illustrates a logical flow chart of one presently preferred embodiment of the program steps used to implement the mobility software application that enables a computer to maintain a continuous connection while changing network interface devices. The program steps, designated generally at 500 in FIG. 5, are preferably implemented in software that executes on the computing device that is switching between network interfaces. However, as will be seen from the following discussion, in some embodiments, aspects of the software can be located and executed at different computing locations within the network.

With continued reference to FIG. 5, in preferred embodiments the overall method enters a loop so as to monitor the connection status of the computing device, such as a portable computer. Thus, at program step 510, the software continuously monitors the connection status of the network interface that is currently associated with a network connection. For example, the computer may currently be connected to an Ethernet network via a hard-wired connection provided by a standard Ethernet NIC. Step 510 continuously monitors the status of that connection. At such point that the NIC is disconnected, processing continues at program step 530, where it is determined if there are any other available network interfaces to maintain a connection with the network. Note that in certain embodiments, this check for a new connection may continue for a predetermined amount of time. For example, if the computer is being transported to a new location, there may be a time delay before a new network connection is available. If a new connection is not available, the mobility software 500 can provide a suitable notification to the user, as is indicated at program step 520. At this point, the existing network connection is terminated. However, if at program step 530 it is determined that there is another available network interface, it will proceed to establish a connection at program step 540. For example, in an exemplary network system, a wireless network interface would be available once the wired network interface is disconnected.

Once the mobility software 500 determines that another network interface is available, and that a network connection is possible, in the preferred embodiment processing will continue at program step 560, where it is determined whether the new network interface is located on the same subnet as the original network interface. If it is determined that the new network interface is located on the same subnet, processing continues at program step 550, where the software will re-associate the new network interface device's unique MAC address with the existing IP address of the previous connection. Since the new network interface is located within the same subnet as the original network interface, then the IP address of the host computing device will be the same. While a number of approaches could be used, in a preferred embodiment, this re-association of the MAC address is accomplished by broadcasting an address resolution protocol (ARP) packet over the network, thereby informing other devices within the network that the device's IP address is now associated with the new MAC address. Future packets addressed to that particular IP address will now include the new MAC address as the destination address.

Figure 6A:
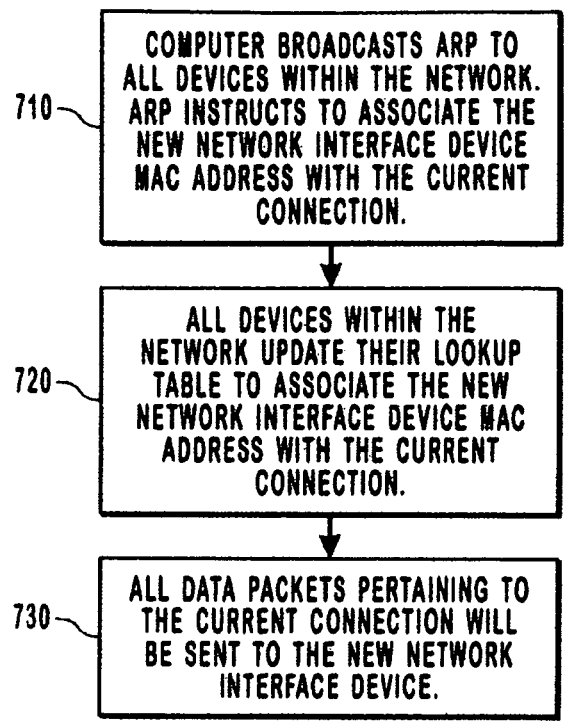
FIG. 6A illustrates a flow chart showing additional details of one presently preferred embodiment.

For example, FIG. 6A illustrates a flow chart of one presently preferred embodiment of the program steps, designated generally at 700, associated with step 550 of FIG. 5. In this particular example, the process of re-associating the new MAC address with the current network connection is preferably handled entirely by the computer that is switching between network interface devices. Consequently, the software used to implement the steps of FIG. 6A executes on the computer and not any of the other elements within the network. In this way, steps associated with the installation and implementation of the software are significantly minimized. By way of example, this process could be utilized in the embodiment shown in FIG. 3 in which the laptop 355 is switching from an Ethernet 350 network interface to a wireless 335 network interface located within the same subnet. First, as program step 710 the computer broadcasts a gratuitous address resolution protocol (ARP) to all of the devices within the network. An ARP is typically used whenever a new device is connected to the network. This step informs other devices within the network to associate a particular MAC address with the IP address of the computer; in this case the MAC address is now associated with the IP address. For example, in FIG. 3, upon execution of program step 710, the ARP packet would inform all of the devices within the network (servers, switches, bridges, etc) that the MAC address of the wireless network interface device is now associated with the IP address of the computer 355 (previously associated with the Ethernet network interface device). Upon execution of the program step 710, the function illustrated at step 720 is performed, that is, each of the devices within the network proceed to update their respective lookup tables (or equivalent) to associate the new MAC address with the IP address of the computer 355. Each device has a lookup table which it uses to associate IP addresses with specific hardware MAC addresses within the subnet. Once the lookup tables are updated, data packets addressed to the IP address of computer 355 will utilize the new MAC address as the destination address.

Returning to FIG. 5, if the mobility software 500 instead determines at program step 560 that the new network interface is connected to a different subnet from the original network interface, the software will re-associate the new network interface device's IP address and MAC address to the existing connection. In one embodiment, this re-association of an network interface located on a different subnet involves the mapping of the old MAC address/IP address with the new MAC address/IP address, so that packets addressed to the old address are received by the device a the new address.

Figure 6B:
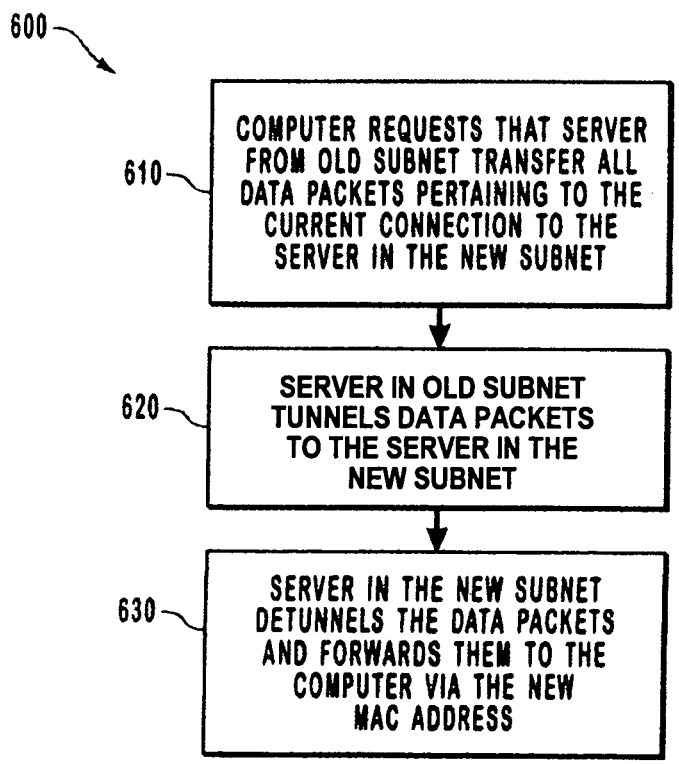
FIG. 6B illustrates a flow chart showing additional details of one presently preferred embodiment.

For example, FIG. 6B illustrates a flow chart illustrating one example of the program steps that can be used to implement the function of element 570 in FIG. 5. This process could, for example, be utilized in the embodiment shown in FIG. 5 in which the computer 475 is switching from an Ethernet 470 network interface to a wireless 445 network interface that is connected to a different subnet of the network. Beginning at program step 610, the computer switching between network interface devices requests that the server in the old subnet transfer all data packets pertaining to the current connection to the server in the new subnet. The old subnet refers to the subnet in which the original network interface device was located and the new subnet refers to the subnet in which the new network interface device is located. For example, in FIG. 4 the old subnet is subnet 2 associated with Ethernet 470 network interface, and the new subnet is subnet 1 associated with the wireless 445 network interface. At program step 620, the server in the old subnet establishes a tunneling mechanism to the server in the new subnet. Here, tunneling generally involves the forwarding of packets addressed to the old IP/MAC address to the new IP/MAC address. At program step 630, the server in the new subnet de-tunnels the data packets and forwards them to the computer via the new MAC address. The unique MAC address of the new network interface device will allow the server in the new subnet to route the data packets to the new network interface device. Through this process, all pending communications between the computer and the network will be forwarded through the new network interface device. If the computer initiates new operations while connected to the new network interface device, the data packets will be routed directly to the computer via the new network interface as normal without having to be tunneled from the old subnet.

It will be evident that there are numerous embodiments of the present invention, which, while not specifically describe above, are clearly within the scope and spirit of the invention. Consequently, the above description is considered to be exemplary only, and the full scope of the invention is to be determined solely by the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of automatically switching a host device from an Ethernet network interface device to a wireless network interface device, while maintaining a network connection, wherein the Ethernet network interface device has a first unique device address, and the wireless network interface device, a second unique device address, the method comprising the steps of:
(a) detecting removal of the host device from an Ethernet network interface associated with said Ethernet network interface device; and (b) establishing a wireless network interface associated with said wireless network interface device; wherein
  (i) the establishment of said wireless network interface involves determining whether the wireless network interface is on the same subnet as the Ethernet network interface;
  (ii) upon determining that the wireless network interface is on the same subnet, broadcasting a signal to update lookup tables in other devices in the subnet to associate the wireless network interface with the second unique device address of the wireless network interface device; and
  (iii) upon determining that the wireless network interface is on a different subnet, effecting the tunneling of data packets pertaining to the network connection from the subnet of the Ethernet network interface to the subnet of the wireless network interface.

2. The method of claim 1, wherein the wireless network interface device is an 802.11-compliant network interface device.

3. The method of claim 1, wherein the first unique device address is a MAC address.

4. The method of claim 1, wherein the second unique device address is a MAC address.

5. The method of claim 1, wherein the method is implemented with computer-executable instructions that execute on the host device.

6. The method of claim 1, wherein the signal that is broadcast to update lookup tables is an address resolution protocol (ARP) packet.

7. The method of claim 1, wherein:
  after detection of removal of the host device from an ethernet network interface, the host device searches for an available wireless network interface device;
  if an available wireless network interface device is not found within a predetermined time period, the host device notifies a user that the network connection will be terminated; and
  if an available wireless network interface device is found, the host device proceeds to said step of establishing a wireless network interface.

8. The method of claim 1, further comprising the step of:
  effecting the tunneling of data packets at the subnet of the wireless network interface, after said tunneling of data packets, and whereby, the data packets are routed to the second unique device address of the wireless network interface device.

9. A method of automatically switching a host device from an wireless network interface device to another network interface device, while maintaining a network connection, and wherein the wireless network interface device has a first unique device address, and the other network interface device has a second unique device address,
  the method comprising the steps of:
  (a) detecting removal of the host device from an wireless network interface associated with said wireless network interface device; and
  (b) establishing another network interface associated with said other network interface device; wherein
    (i) the establishment of said other network interface involves determining whether the other network interface is on the same subnet as the wireless network interface,
    (ii) upon determining that the other network interface is on the same subnet, broadcasting a signal to update lookup tables in other devices in the subnet to associate the other network interface with the second unique device address of the other network interface device, and
    (iii) upon determining that the other network interface is on a different subnet, effecting the tunneling of data packets pertaining to the network connection from the subnet of the wireless network interface to the subnet of the other network interface.

10. The method of claim 9, wherein the wireless network interface device is an 802.11-compliant network interface device, and said other network interface device is an Ethernet network interface device.

11. The method of claim 9, wherein the first unique device address is a MAC address.

12. The method of claim 9, wherein the second unique device address is a MAC address.

13. The method of claim 9, wherein the method is implemented with computer-executable instructions that execute on the host device.

14. The method of claim 9, wherein the signal that is broadcast to update lookup tables is an address resolution protocol (ARP) packet.

15. The method of claim 10, wherein:
  after detection of removal of the host device from a wireless network interface, the host device searches for an available Ethernet network interface device;
  if an available Ethernet network interface device is not found within a predetermined time period, the host device notifies a user that the network condition will be terminated; and
  if an available Ethernet network interface device is found, the host device proceeds to said step of establishing a Ethernet network interface.

16. The method of claim 10, further comprising the step of:
  effecting the detunneling of data packets at the subnet of the Ethernet network interface, after said tunneling of data packets, and whereby, the data packets are routed to the second unique device address of the Ethernet network interface device.

* * * * *